US012801190B2

(12) United States Patent
Senatori et al.

(10) Patent No.: US 12,801,190 B2
(45) Date of Patent: Nov. 17, 2026

(54) HINGES WITH LIFT SLOTS

(71) Applicant: Hewlett-Packard Development Company, L.P., Spring, TX (US)

(72) Inventors: Mark David Senatori, Spring, TX (US); Jin Cherl Kwon, Spring, TX (US); Chad Patrick Paris, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 154 days.

(21) Appl. No.: 19/042,686

(22) Filed: Jan. 31, 2025

(65) Prior Publication Data

US 2026/0227828 A1 Aug. 6, 2026

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01)

(58) Field of Classification Search
None
See application file for complete search history.

(56) References Cited

U.S. PATENT DOCUMENTS

| | | | | |
|---|---|---|---|---|
| 5,632,066 | A * | 5/1997 | Huong | G06F 1/1681 403/68 |
| 8,978,209 | B1 * | 3/2015 | Lin | E05D 3/06 16/337 |
| 9,500,013 | B2 | 11/2016 | Senatori | |
| 9,778,704 | B2 * | 10/2017 | Motosugi | G06F 1/1618 |
| 9,964,988 | B2 * | 5/2018 | Rittenhouse | G06F 1/1681 |
| 10,809,772 | B1 * | 10/2020 | Wang | E05D 7/0009 |
| 10,852,777 | B2 * | 12/2020 | Yuan | G06F 1/1618 |
| 10,914,104 | B2 * | 2/2021 | Shen | G06F 1/1683 |
| 10,976,782 | B2 * | 4/2021 | Singh | G06F 1/1681 |
| 11,627,209 | B2 * | 4/2023 | Määttä | E05D 11/082 16/342 |
| 12,428,887 | B2 * | 9/2025 | Määttä | G06F 1/1681 |
| 2003/0163900 | A1 * | 9/2003 | Rude | G06F 1/1681 16/337 |
| 2006/0048337 | A1 * | 3/2006 | Lowry | G06F 1/1681 16/342 |
| 2011/0072620 | A1 * | 3/2011 | Wang | H04M 1/0216 16/342 |
| 2013/0135809 | A1 * | 5/2013 | Uchiyama | G06F 1/1681 16/371 |
| 2013/0318746 | A1 * | 12/2013 | Kuramochi | G06F 1/1681 16/371 |

(Continued)

*Primary Examiner* — Xanthia C Relford
(74) *Attorney, Agent, or Firm* — Quarles & Brady LLP

(57) ABSTRACT

An electronic computing device may include a first housing, a second housing, and a hinge coupled to the first housing and the second housing. The hinge may enable the first housing to rotate and lift relative to the second housing. The hinge may include a shaft, a collar coupled to the shaft, a bracket coupled to the collar via a lift slot, and a brace coupled to the bracket and the shaft. During rotation of the first housing, the protrusion may slide in the helical channel. The collar may translate along the shaft in a first direction via the helical channel and translate along the bracket in a second direction via the lift slot. The brace may block translation of the shaft relative to the first housing.

20 Claims, 17 Drawing Sheets

(56) References Cited

U.S. PATENT DOCUMENTS

| | | | | |
|---|---|---|---|---|
| 2016/0010375 | A1* | 1/2016 | Rittenhouse | G06F 1/1618 16/338 |
| 2016/0123054 | A1* | 5/2016 | Senatori | E05D 3/18 16/359 |
| 2017/0177026 | A1* | 6/2017 | Rittenhouse | E05D 3/12 |
| 2019/0056768 | A1* | 2/2019 | Lin | G06F 1/1681 |
| 2021/0103317 | A1* | 4/2021 | Raju | G06F 1/1681 |
| 2021/0240231 | A1* | 8/2021 | Ku | G06F 1/1618 |

* cited by examiner

HINGES WITH LIFT SLOTS

BACKGROUND

Hinges for electronic devices can be provided to rotate the devices from a closed position to an open position.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are not to be considered limiting of its scope, the disclosure will be described with additional specificity and detail through use of the accompanying drawings. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented here. The drawings are drawn to scale, but such scale should not be interpreted as limiting and some features may be enlarged or reduced for purposes or presentation. The drawings may omit some features for the sake of clarity. The relative dimensions and proportions as shown are not intended to limit the present disclosure. It will be readily understood that the aspects of the present disclosure, as generally described herein, and illustrated in the figures, can be arranged, substituted, combined, and designed in a wide variety of different configurations, all of which are explicitly contemplated and make part of the present disclosure.

DETAILED DESCRIPTION

The present disclosure generally relates to a hinge for electronic computing devices (e.g., notebook, laptop, etc.).

The hinge can be positioned between and/or connect a first housing (e.g., a display housing) and a second housing (e.g., a chassis with a keyboard) of the electronic device. As the electronic device opens (e.g., by lifting or rotating the first housing relative to the second housing), the hinge can lift the first housing and rotate the first housing relative to the second housing. Example methods of using the hinge are also disclosed. The hinges described herein can allow the second housing to avoid having a rotational clearance cutout, which can provide additional space for other structures, such as heat exchangers.

Figure 1A:
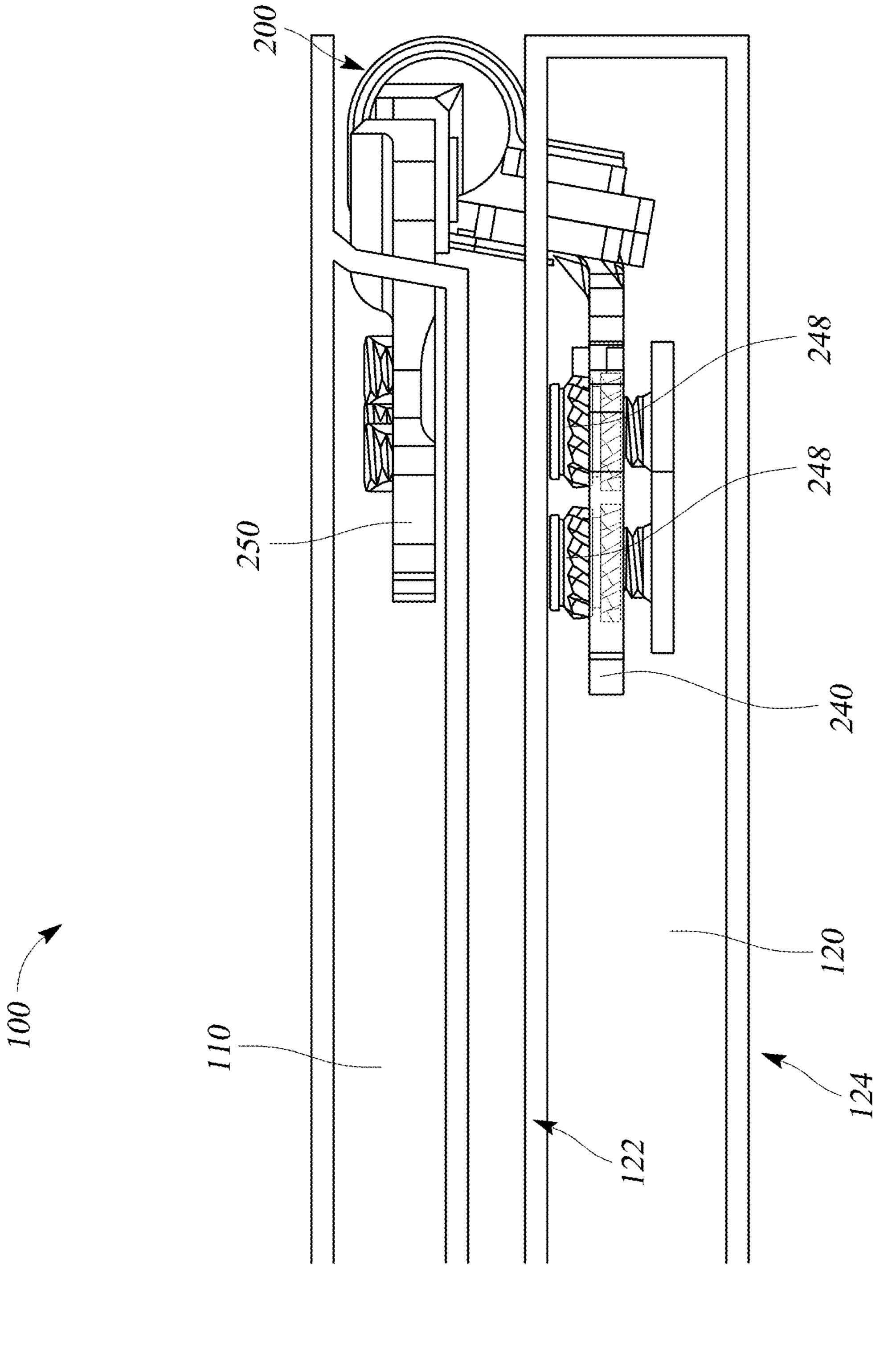
FIG. 1A illustrates an example electronic computing device in a closed position and FIG. 1B illustrates the electronic computing device in an open position.
Figure 1B:
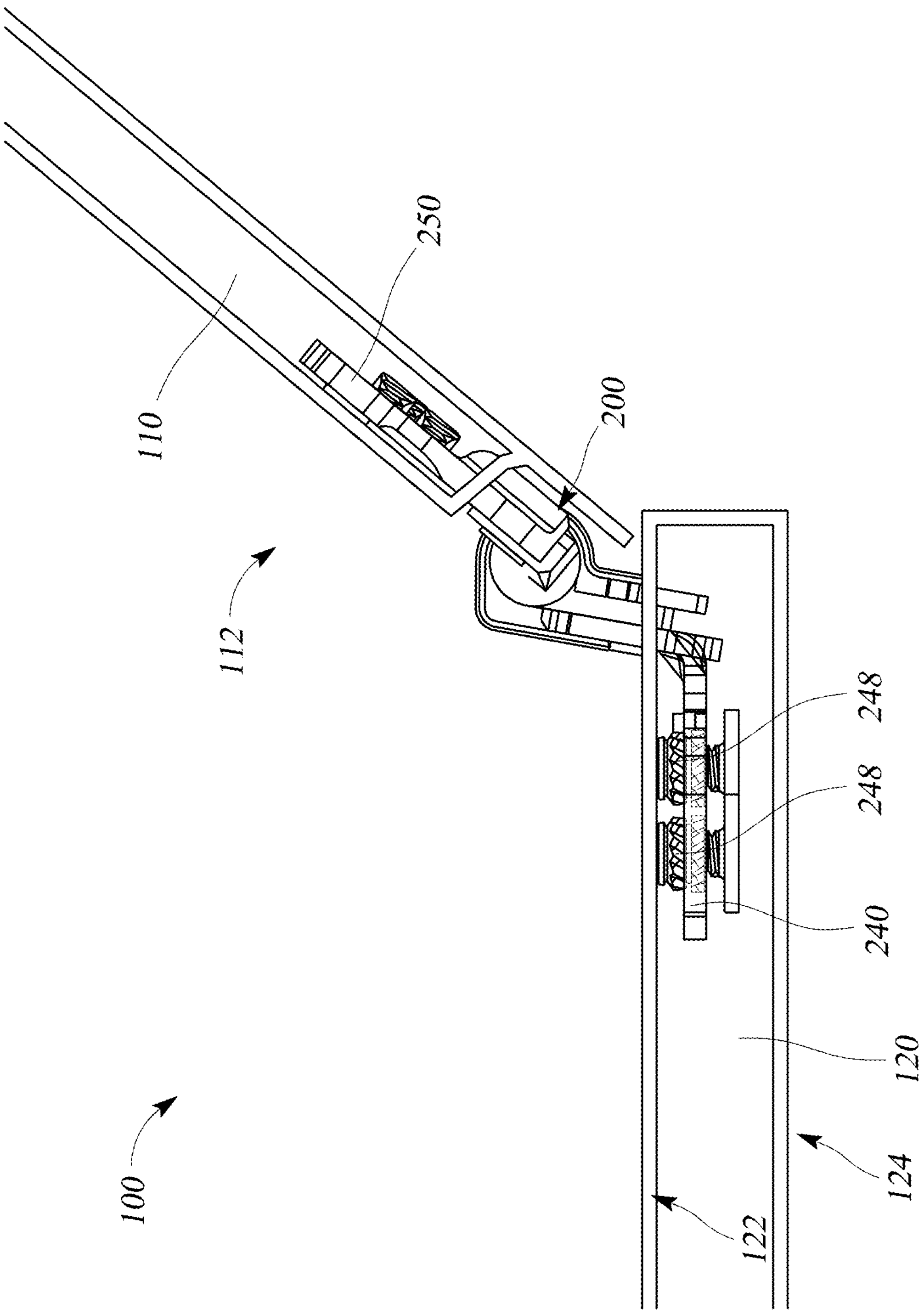

FIGS. 1A-1B illustrate an example electronic computing device 100. The computing device 100 can, for example, be a laptop or a notebook computer. With reference to FIG. 1A, the computing device 100 is in a closed, folded position. The computing device 100 can have a first housing 110 (e.g., a display housing) and a second housing 120 (e.g., a chassis with a keyboard). The first housing 110 and the second housing 120 can be connected via a hinge assembly 200 (e.g., lift hinge assembly). The hinge assembly 200 can join the first housing 110 and the second housing 120 at a region adjacent to the respective ends of the first housing 110 and the second housing 120, such as a bottom end of the first housing 110 and a rear end of the second housing 120.

As shown in FIG. 1B, the first housing 110 can rotate to an open, unfolded position. The first housing 110 and the second housing 120 can rotate relative to one another via the hinge assembly 200. Rotating the first housing 110 relative to the second housing 120 can enable opening of the computing device 100 so that a display panel 112 for viewing an output of the computing device 100 is visible to a user. The display panel 112 can include an input device for a user (e.g., a touch screen). The second housing 120 can include a top surface 122 and a bottom surface 124 that is opposite to the top surface 122. The top surface 122 can include an input device (e.g., a keyboard, touchpad, etc.).

Figure 1C:
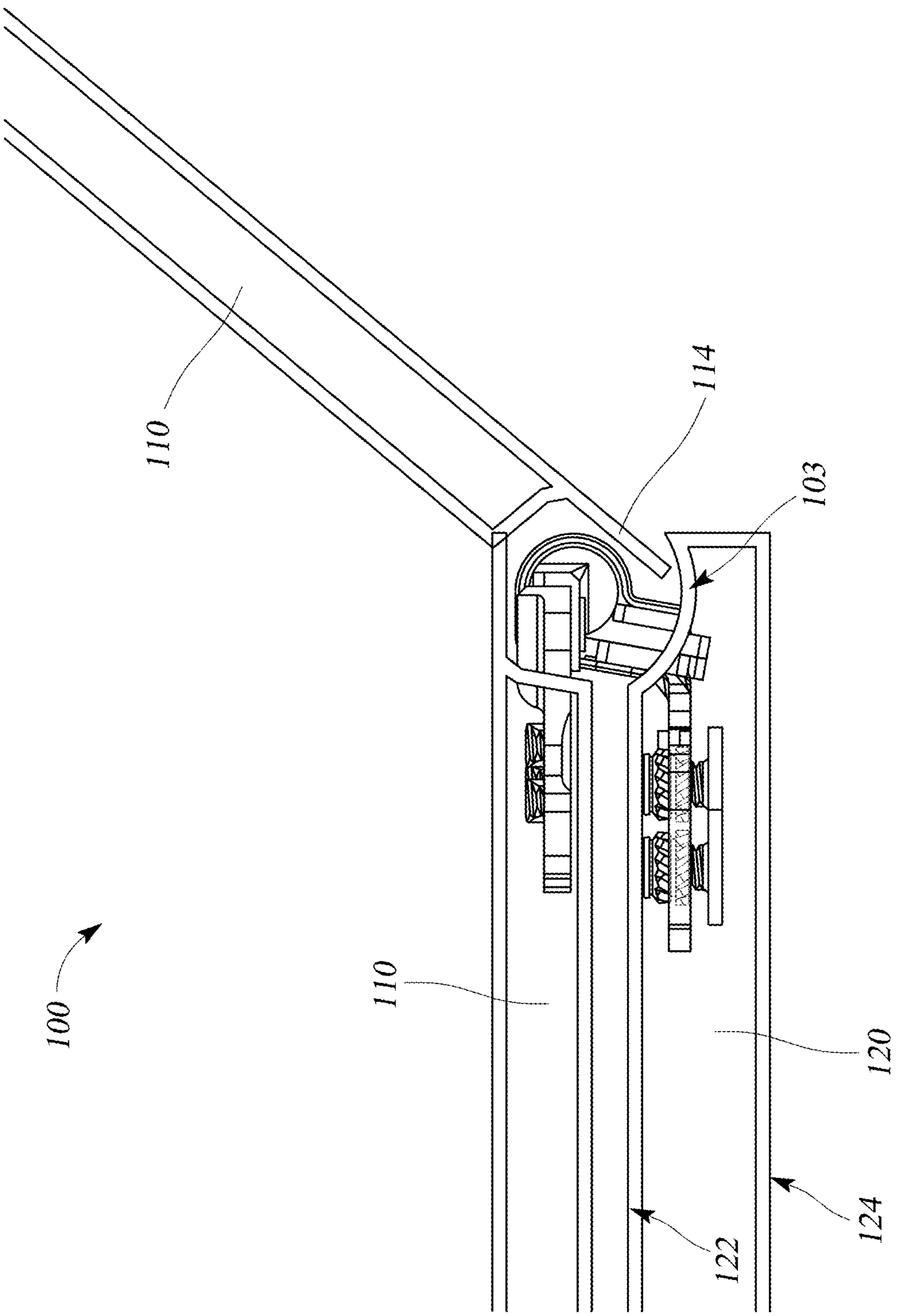
FIG. 1C illustrates an example electronic computing device having a rotational clearance cutout.

The hinge assembly 200 can rotate and lift the first housing 110 away from the second housing 120. This can, in certain implementations, avoid the need for the second housing 120 to have a rotational clearance cutout 103 (e.g., a recess in the top surface 122 that provides physical clearance for a hinge and/or the hinge's movement) as shown in FIG. 1C (e.g., an example of the computing device 100 with a rotational clearance cutout 103 for a rear portion 114 of the first housing 110 when the computing device 100 is opened and closed) yet still allow for rotation of the first housing 110 relative to the second housing 120. The hinge assembly 200 can allow for the second housing 120 to have a thinner overall thickness or profile (e.g., since the physical space requirement for a clearance cutout can be avoided), can increase thermal performances of the computing device 100 (e.g., since larger heat exchangers (not shown) can be positioned on or within the second housing 120 and/or within the space otherwise occupied by the rotational clearance cutout 103), and/or can provide other benefits. Several variants of the computing device 100 do not include a rotational clearance cutout.

Figure 2A:
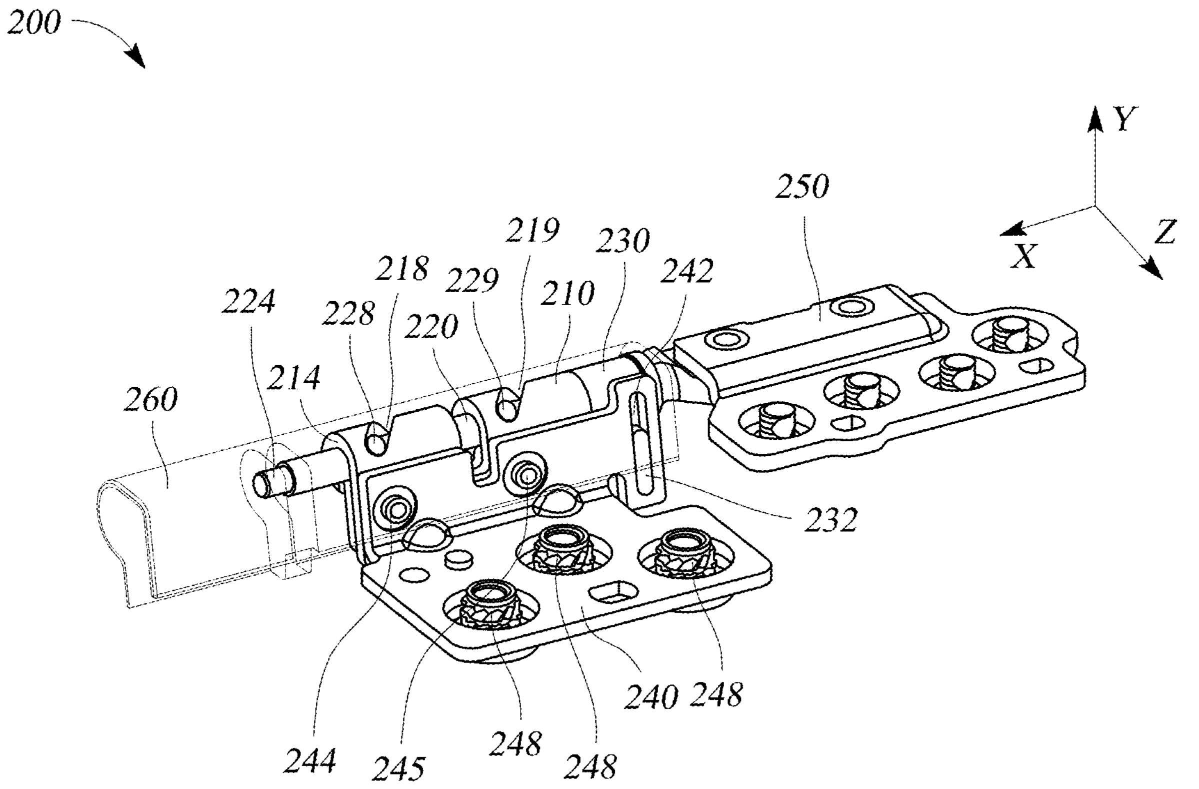
FIG. 2A illustrates a perspective view of a hinge for use in the electronic computing device of FIG. 1A.
Figure 2B:
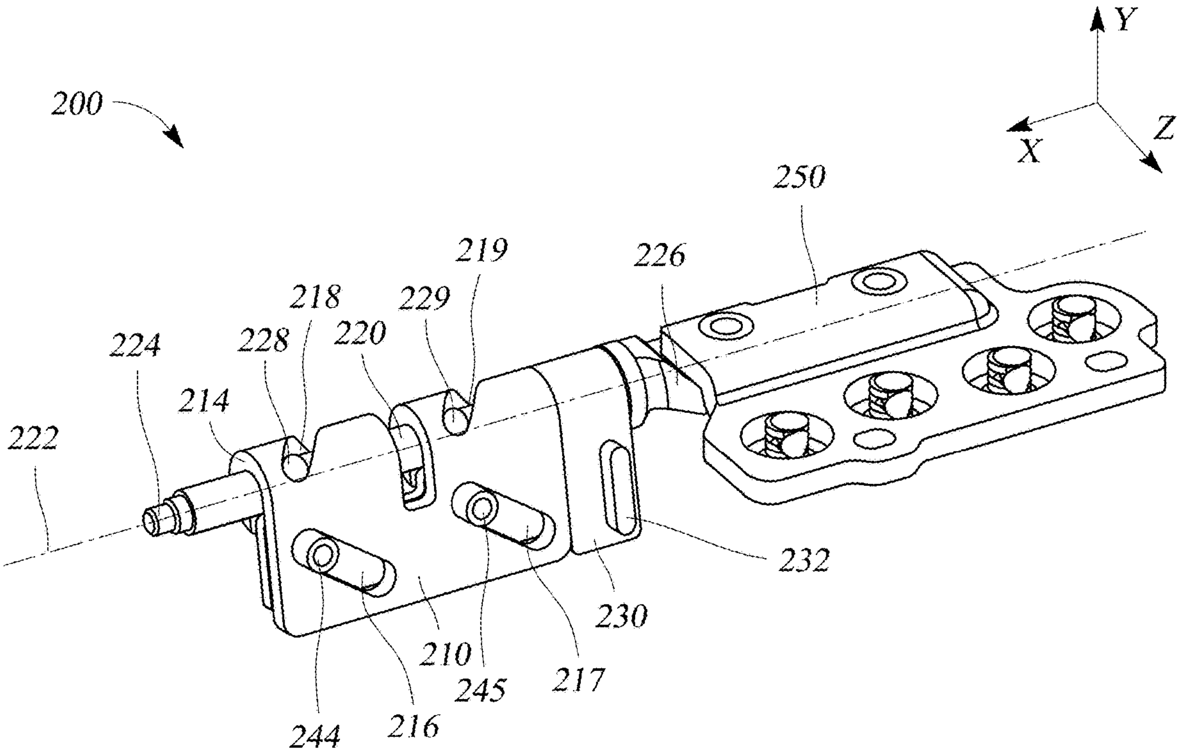
FIG. 2B illustrates a perspective view of the hinge of FIG. 2A with certain portions removed for illustrative purposes.
Figure 2C:
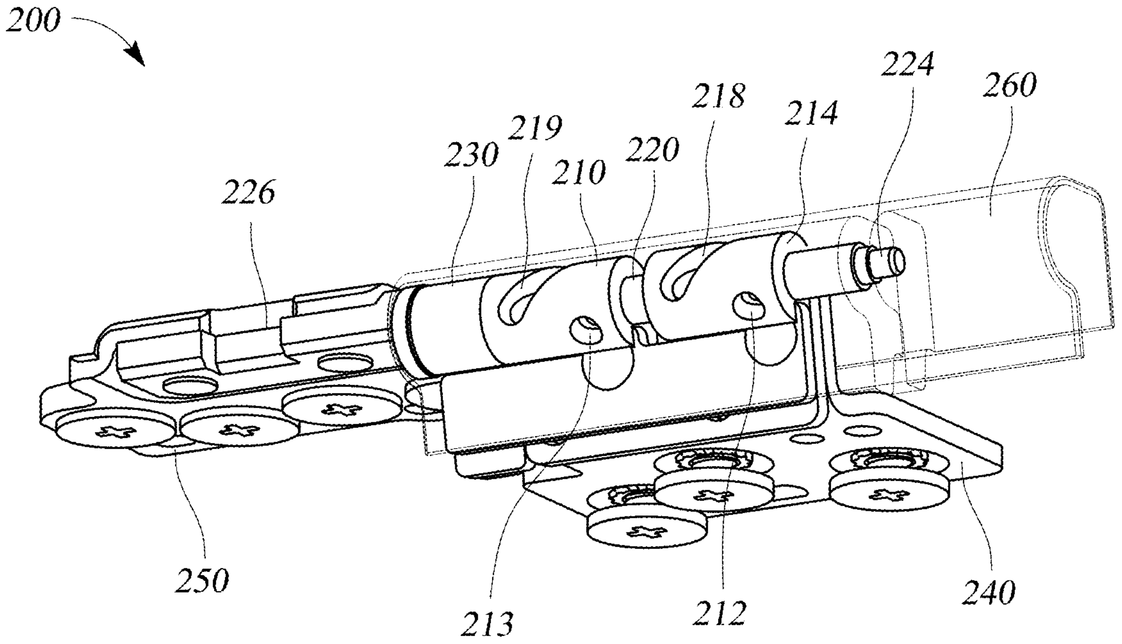
FIG. 2C illustrates a rear perspective view of the hinge of FIG. 2A.

FIGS. 2A-2C illustrate an example of the hinge assembly 200. The hinge assembly 200 can include a collar 210 and a shaft 220. The collar 210 and shaft 220 can be matingly engaged. The shaft 220 can have a first protrusion 228 and a second protrusion 229. The collar 210 can couple to or extend at least partially around (e.g., wrap around) the shaft 220. In certain implementations, the collar 210 can provide a frictional force along the shaft 220 to keep the first housing 110 in an open position relative to the second housing 120 (e.g., to prevent the first housing 110 from freely sliding back to the closed position). In various examples, the shaft 220 is positioned in and/or moves with the first housing 110.

The collar 210 can have a plurality of channels, such as a first helical channel 218 and a second helical channel 219. The first helical channel 218 can receive the first protrusion 228. The second helical channel 219 can receive the second protrusion 229. The protrusions 228, 229 can slide within the helical channels 218, 219, respectively. In various examples, this can allow the collar 210 to slide along and pivot about a longitudinal axis 222 of the shaft 220 and/or a direction generally parallel thereto. In certain examples, the collar 210 slides and pivots simultaneously. As the shaft 220 rotates to open the computing device 100 (e.g., the first housing 110 rotates relative to the second housing 120), the collar 210 can translate along the shaft 220 in a first direction (e.g., a horizontal direction, along the rotational or longitudinal axis 222 of the shaft 220) via the first helical channel 218 and the second helical channel 219.

As shown, the helical channel 218, 219 can wrap at least partially around and extend partially along the longitudinal axis 222 of the shaft 220. In some examples, the first helical channel 218 and the second helical channel 219 can wrap around the shaft 220 at least about 90 degrees and/or less than or equal to about 160 degrees, such as approximately 135-degrees. The partial wrapping (e.g., 135-degree wrapping) of the first helical channel 218 and the second helical channel 219 around the shaft 220 can allow the computing device 100 to move from the closed position (e.g., at or approximately the 0-degree position) to the open or fully open position (e.g., the 135-degree position).

The collar 210 can have one or more lifting elements, such as a plurality of lift slots. The non-limiting example shown has a first lift slot 216 and a second lift slot 217. The first lift slot 216 and the second lift slot 217 can be angled along the collar 210 (e.g., angled relative to a horizontal axis, angled at approximately 45-degrees along the X-Y plane). As discussed in more detail below, the lift slot 216, 217 can enable the hinge assembly 200 to lift upward relative to the second housing 120. The collar 210 can have a first guide pin hole 212 and a second guide pin hole 213. The first guide pin hole 212 and the second guide pin hole 213 can be clearance holes positioned on the collar 210. The holes 212, 213 can facilitate the assembly of the first protrusion 228 and second protrusion 229 to the shaft 220. For example, the first and second protrusions 228, 229 can be positioned through the first and second helical channels 218, 219 and tightened to the shaft 220 with a fastening mechanism (e.g., a screwdriver, a hex key, etc.) via the first guide pin hole 212 and the second guide pin hole 213.

The hinge assembly 200 can include a bracket 240. The bracket 240 can be matingly engaged with the collar 210. For example, the bracket 240 can be coupled to or attached to the collar 210 via the first lift slot 216 and the second lift slot 217. The bracket 240 can have a first guide pin 244 that extends into or through the first lift slot 216 and a second guide pin 245 that extends into or through the second lift slot 217. The bracket 240 can be coupled to the second housing 120, such as via fasteners 248. In various examples, the hinge assembly 200, or aspects thereof, pivots and translates relative to the bracket 240 and the second housing 120.

During opening of the computing device 100 (e.g., the first housing 110 rotates relative to the second housing 120), the collar 210 can translate in a second direction (e.g., a vertical direction, along the positive Y-axis) along the first lift slot 216 and the second lift slot 217 via the first guide pin 244 and the second guide pin 245. The shaft 220 (and the first housing 110) can translate vertically upwards relative to the second housing 120 due to the first lift slot 216 and the second lift slot 217. The lifting can move the hinge assembly 200 away from the second housing 120, which, in certain examples, can allow the second housing 120 to avoid having a rotational clearance cutout. The collar 210 can simultaneously translate along the longitudinal axis of the shaft 220 and translate vertically as the guide pins 244, 245 slide along the lift slots 216, 217 as the first housing 110 rotates open.

In certain examples, the first lift slot 216 and the second lift slot 217 extend along a linear path. The first lift slot 216 and the second lift slot 217 can allow the shaft 220 (and/or the first housing 110) to have a linear relationship between the rotation rate of the shaft 220 and the lift rate of the shaft 220. For example, in some implementations the shaft 220 rotates approximately equally as fast as it translates.

The hinge assembly 200 can include a brace 230 (e.g., a collar brace). The brace 230 can be movably coupled to the bracket 240 and to the shaft 220. A portion of the brace 230 can wrap at least partially around an outer surface of the shaft 220. The brace can matingly engage with the bracket 240. For example, the brace 230 can include a protrusion 232 (e.g., an elongate protrusion) that can slide or translate along a slot 242 in the bracket 240. In various examples, the slot 242 is linear (e.g., along the Y-axis).

The brace 230 can allow the shaft 220 to rotate (e.g., about the longitudinal axis 222, about the X-axis) and translate (e.g., in the Y-direction). For example, as the shaft 220 rotates (e.g., to open the computing device 100), the shaft 220 can translate upwards along the slot 242 as the protrusion 232 translates upwards along the slot 242. As the shaft 220 rotates in an opposite direction (e.g., to close the computing device 100), the shaft 220 can translate downwards along the slot 242 as the protrusion 232 translates downwards along the slot 242. The brace 230 can inhibit or prevent (e.g., block) movement of the shaft 220 in the horizontal direction (e.g., along the rotational or longitudinal axis 222 of the shaft 220) relative to the first housing 110 or second housing 120 as the first housing 110 rotates relative to the second housing 120. In some examples, the brace 230 can be removed from the hinge assembly 200 to allow the shaft 220 to translate in the horizontal direction.

The hinge assembly 200 can include a second bracket 250 (e.g., a display housing bracket). The second bracket 250 can be connected or coupled to the first housing 110. The shaft 220 can have a coupling region 226 that fixedly connects to the second bracket 250. When the shaft 220 rotates and lifts (e.g., translates upwards and downwards) the second bracket 250 rotates and lifts to open the computing device 100 (e.g., rotating and lifting first housing 110 relative to the second housing 120). The shaft 220 and second bracket 250 can move together as a unit.

The hinge assembly 200 can include a cap 260 covering portions of the shaft 220, the collar 210, the brace 230, and the bracket 240. For purposes of presentation, the cap is not shown in FIG. 2B.

During opening of the first housing 110, the collar 210 can translate in a first direction (e.g., first horizontal direction, along the longitudinal axis 222, along the positive X-axis) along the shaft 220 towards a terminal end 224 of the shaft 220. During closing of the first housing 110, the collar 210 can translate in an opposite second direction (e.g., second horizontal direction, along the negative X-axis) along the shaft 220 away from the terminal end 224 of the shaft 220. The collar 210 can maintain a substantially constant contact area with the shaft 220 in the first direction. For example, in certain implementations, an end 214 of the collar does not translate past the terminal end 224 of the shaft 220. Having the collar 210 maintain a substantially constant contact area with the shaft 220 can provide a fixed (e.g., generally constant) rotational torque throughout the movement between the open and closed positions. This can avoid the feeling of "looser" or "tighter" spots during opening or closing of the first housing 110.

In some variants, the hinge assembly 200 can have a variable rotational torque. The collar 210 can translate in a first direction (e.g. first horizontal direction, along the longitudinal axis 222, along the positive X-axis) along the shaft 220 to a position beyond the terminal end 224 of the shaft 220 (e.g., the end 214 of the collar 210 extends beyond the terminal end 224). The contact area between the shaft 220 and the collar 210 can be reduced once the collar 210 moves beyond the terminal end 224 of the shaft 220, thereby reducing the torque required to further open the computing device 100. As such, the torque can be variable (e.g., due to the reducing contact area). A variable torque implementation can provide a feeling of more torque during an initial stage of opening of the first housing 110 (e.g., about 0-90 degrees) and less torque during a subsequent stage of opening (e.g., about 91-135 degrees).

Figure 3A:
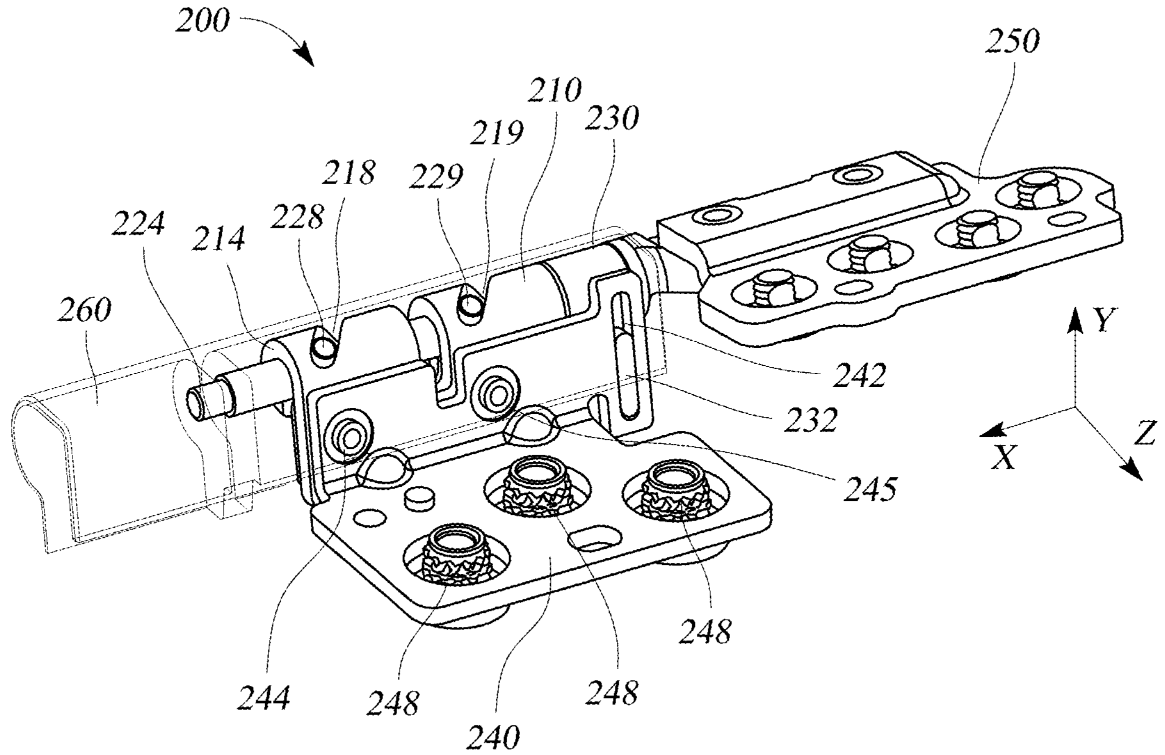
FIGS. 3A-3D illustrate stages of rotating the hinge of FIG. 2A from a closed position to an open position.

FIGS. 3A-3D illustrate stages of rotating the hinge assembly 200 from a first position (e.g., 0-degree rotational position) to a second position (e.g., 135-degree rotational position). FIG. 3A shows the hinge assembly 200 at or near the 0-degree position when the computing device 100 is in a closed, folded position. The first protrusion 228 is positioned adjacent a first end of the first helical channel 218. The second protrusion 229 is positioned adjacent a first end of the second helical channel 219. The first guide pin 244 and the second guide pin 245 are positioned or located at an end of the first lift slot 216 and the second lift slot 217, respectively. The protrusion 232 is located at a bottom end of the slot 242.

Figure 3B:
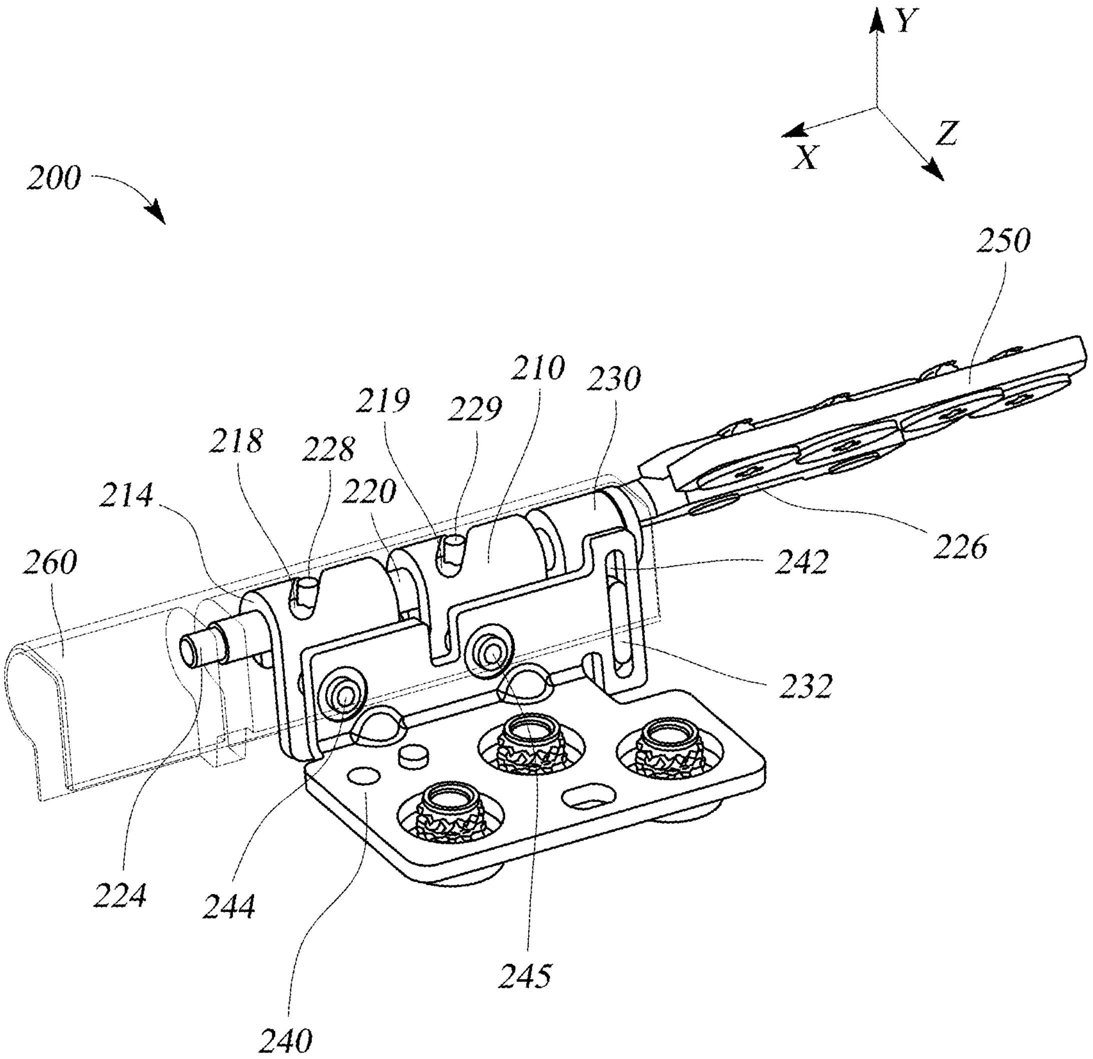

FIG. 3B shows the hinge assembly 200 as the computing device 100 is beginning to be opened (e.g., during rotation of the first housing 110 relative to the second housing 120). As shown, the second bracket 250 (which is connected to the first housing 110) has been rotated, such as if a user had grasped the first housing 110 and was rotating the first housing 110 relative to the second housing 120. During this process, the shaft 220 rotates with the second bracket 250. The first protrusion 228 can travel along the first helical channel 218 as the shaft 220 rotates and the second protrusion 229 can travel or slide along the second helical channel 219 as the shaft 220 rotates. The shaft 220 can translate upwards along the first lift slot 216 and the second lift slot 217 (e.g., as the first guide pin 244 and the second guide pin 245 move towards second ends of the first lift slot 216 and second lift slot 217, respectively). The shaft 220 can translate upwards along the bracket 240 without translating horizontally due the brace 230 (e.g., the brace 230 allows for a sliding interface between the slot 242 and the protrusion 232 as the shaft 220 rotates but blocks a horizontal movement of the shaft 220). The second bracket 250 connected to the first housing 110 can move upwards and away from the bracket 240 connected to the second housing 120.

In some implementations, the end 214 of the collar 210 can move closer to the terminal end 224 of the shaft 220 as the shaft 220 rotates. A second end 215 of the collar can move away from the brace 230. In certain implementations, the collar 210 is adjacent the brace 230 when the first housing 110 is in the closed position and the collar 210 is spaced apart from the brace 230 (e.g., in the X-direction) when the first housing 110 is in the open position and/or a distance (e.g., in the X-direction) between the collar 210 and brace 230 increases when the first housing 110 is moved from the closed position to the open position.

Figure 3C:
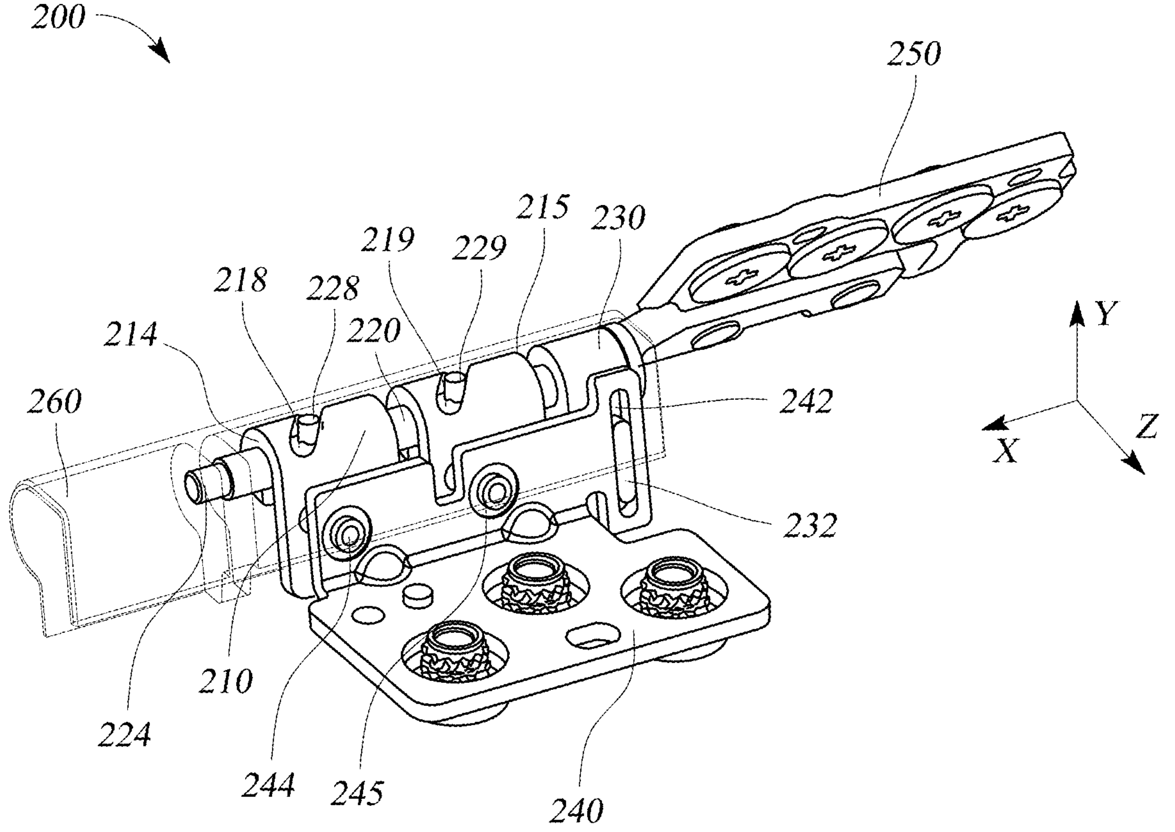

FIG. 3C shows the hinge assembly 200 as the shaft 220 has rotated the computing device 100 further open to a partially open position (e.g., the first housing 110 is rotated further upwards and away from the second housing 120). The first protrusion 228 can translate further along the first helical channel 218 and the second protrusion 229 can translate further along the second helical channel 219. In some examples, the frictional force between the shaft 220 and the collar 210 can keep the first housing 110 in a partially open position. The shaft 220 can translate further in a vertical direction (e.g., along the Y-axis) and away from the bracket 240. The brace 230 can inhibit or prevent the shaft 220 from moving horizontally while allowing the shaft 220 to translate vertically via the protrusion 232 and the slot 242. For example, the brace 230 can allow for a sliding interface between the slot 242 and the protrusion 232 as the shaft 220 rotates but blocks a horizontal movement. The first guide pin 244 and second guide pin 245 can move towards respective second ends of the first lift slot 216 and the second lift slot 217. The end 214 of the collar 210 can continue to move closer (e.g., translate along the rotational axis of the shaft 220) to the terminal end 224 of the shaft 220 as the shaft 220 rotates. The second end 215 of the collar can move further away from the brace 230.

Figure 3D:
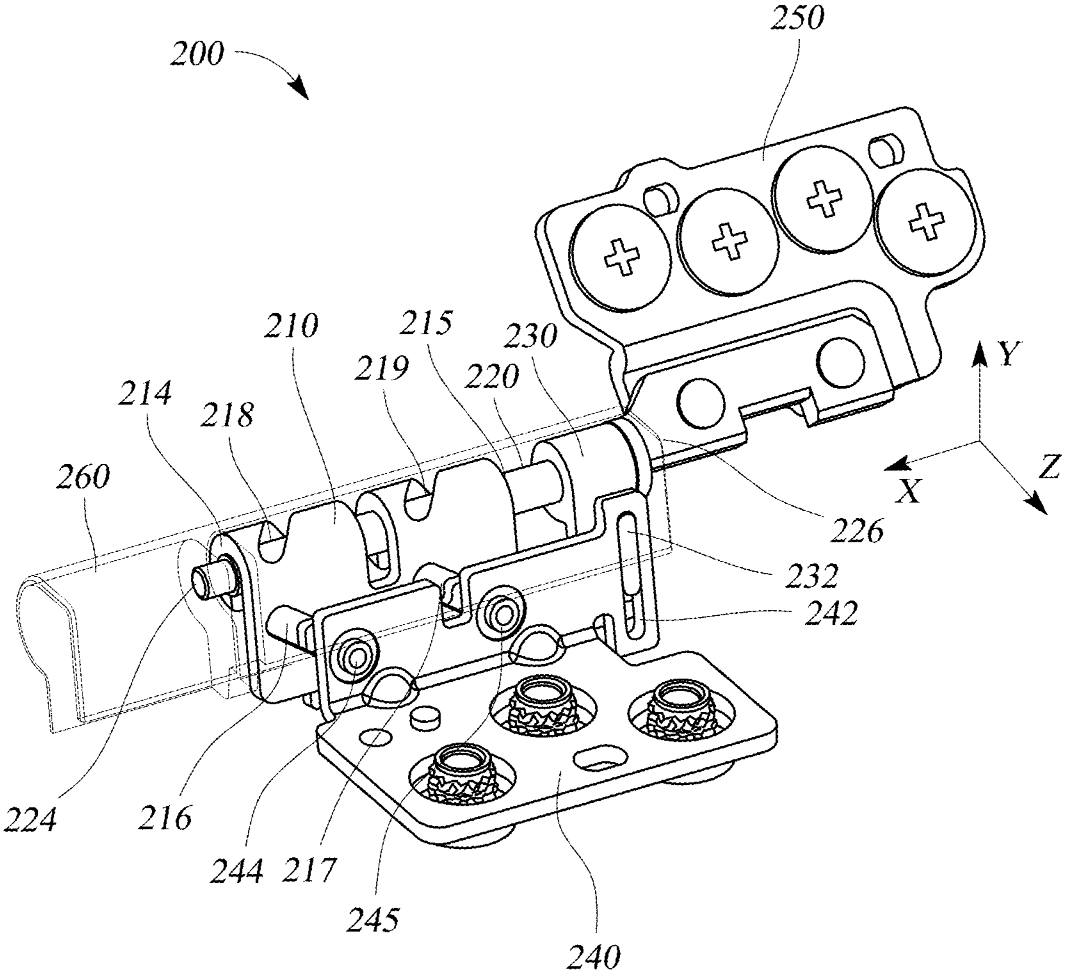

FIG. 3D shows the hinge assembly 200 when the shaft 220 has rotated the computing device 100 to the second position or the fully open position (e.g., 135-degree position). In some examples, the frictional force between the shaft 220 and the collar 210 can keep first housing 110 in the fully open position. The first protrusion 228 can be positioned adjacent to the second end of the first helical channel 218. The second protrusion 229 can be positioned adjacent to the second end of the second helical channel 219. The first guide pin 244 and second guide pin 245 can be positioned at the respective second ends of the first lift slot 216 and the second lift slot 217. The protrusion 232 can be positioned at a top end of the slot 242.

To close the computing device 100, the shaft 220 can be rotated in the opposite direction to move the first protrusion 228 and the second protrusion 229 to the first end of the first helical channel 218 and second helical channel 219, respectively. The first guide pin 244 and second guide pin 245 can move towards respective first ends of the first lift slot 216 and the second lift slot 217. The protrusion 232 can translate downwards along the slot 242 to vertically displace the shaft 220 (and the first housing 110) without translating the shaft 220 to close the computing device 100.

Figure 4A:
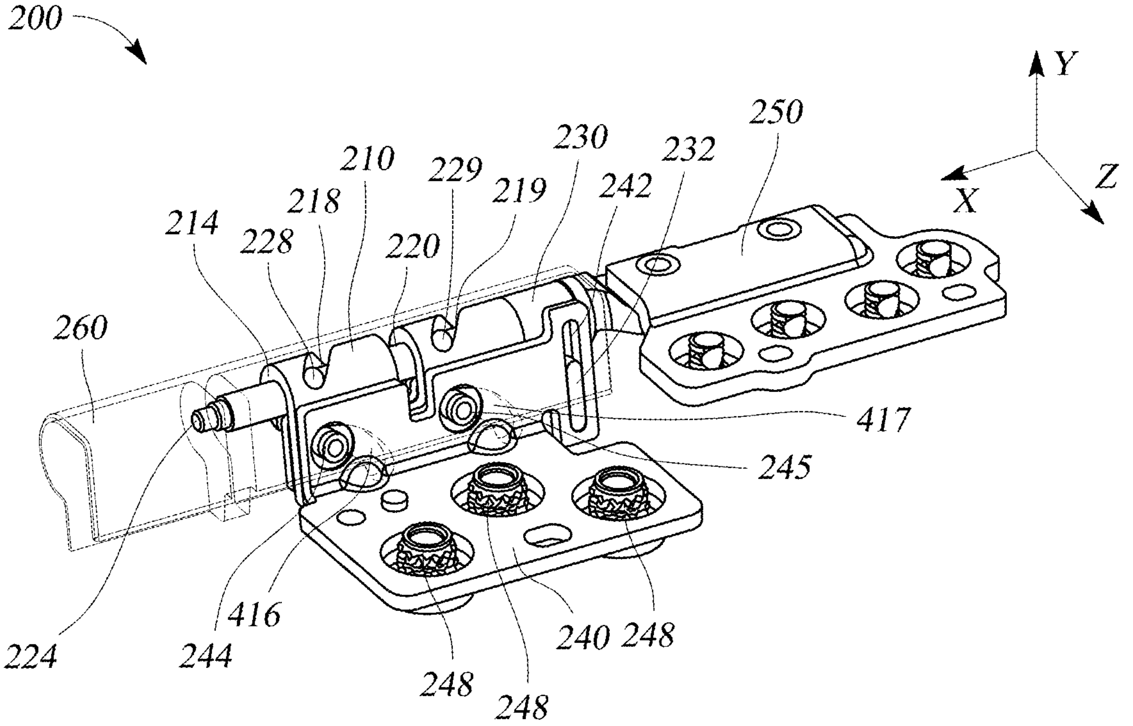
FIGS. 4A and 4B illustrate a perspective view of another embodiment of hinge with a collar having curved lift slots for use in the electronic computing device of FIG. 1A.
Figure 4B:
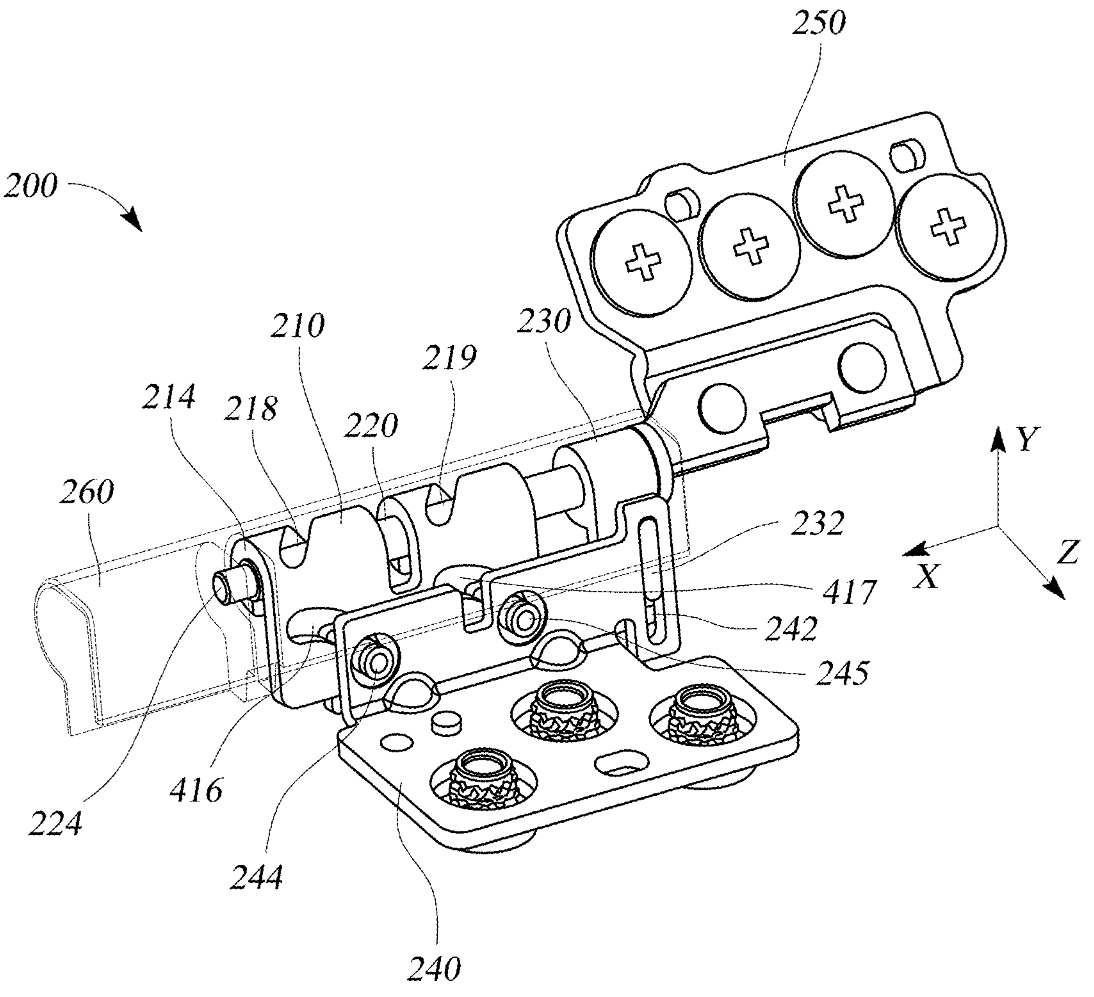

FIGS. 4A and 4B illustrate another embodiment of the hinge assembly 200 where the first lift slot 416 and the second lift slot 417 extend along a curved path. Due to the curved path, the lifting speed of the first housing 110 relative to the second housing 120 can be variable and/or accelerated (e.g., have a non-linear relationship between the rotation rate of the shaft 220 and the lift rate of the shaft 220). In some examples, the non-linear relationship occurs at the beginning stages of opening the computing device 100 (e.g., as shown in FIG. 4A) such that the first housing 110 can lift vertically upward (e.g., along the positive Y-axis) faster than a rotational speed of the shaft 220. In some variants, the non-linear relationship can occur during closing of the computing device 100 (e.g., as shown in FIG. 4B where the first guide pin 244 and second guide pin 245 can be positioned at the respective second ends of the first lift slot 416 and the second lift slot 417) such that the first housing

110 can descend vertically downward (e.g., along the negative Y-axis) faster than a rotational speed of the shaft 220.

Figure 5:
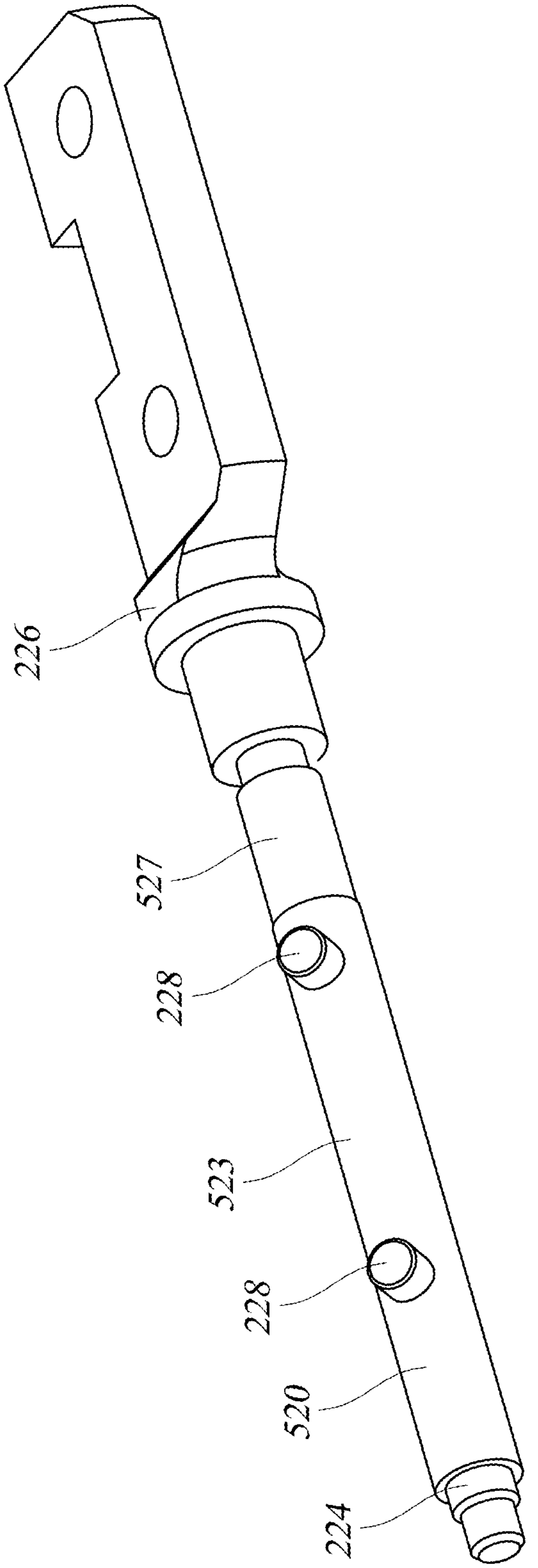
FIG. 5 illustrates a perspective view of another embodiment of a shaft for use in the electronic computing device of FIGS. 1A and 1B.

FIG. 5 illustrates another embodiment of a shaft 520 which can have a first section 523 and a second section 527. The first section 523 of the shaft 520 can have a different (e.g., greater) diameter than a second section 527 of the shaft 520. The first section 523 can include the first protrusion 228 and second protrusion 229 extending from or extending through an outer surface of the shaft 520. The second section 527 can be positioned closer to (e.g., adjacent to) the coupling region 226.

Figure 6A:
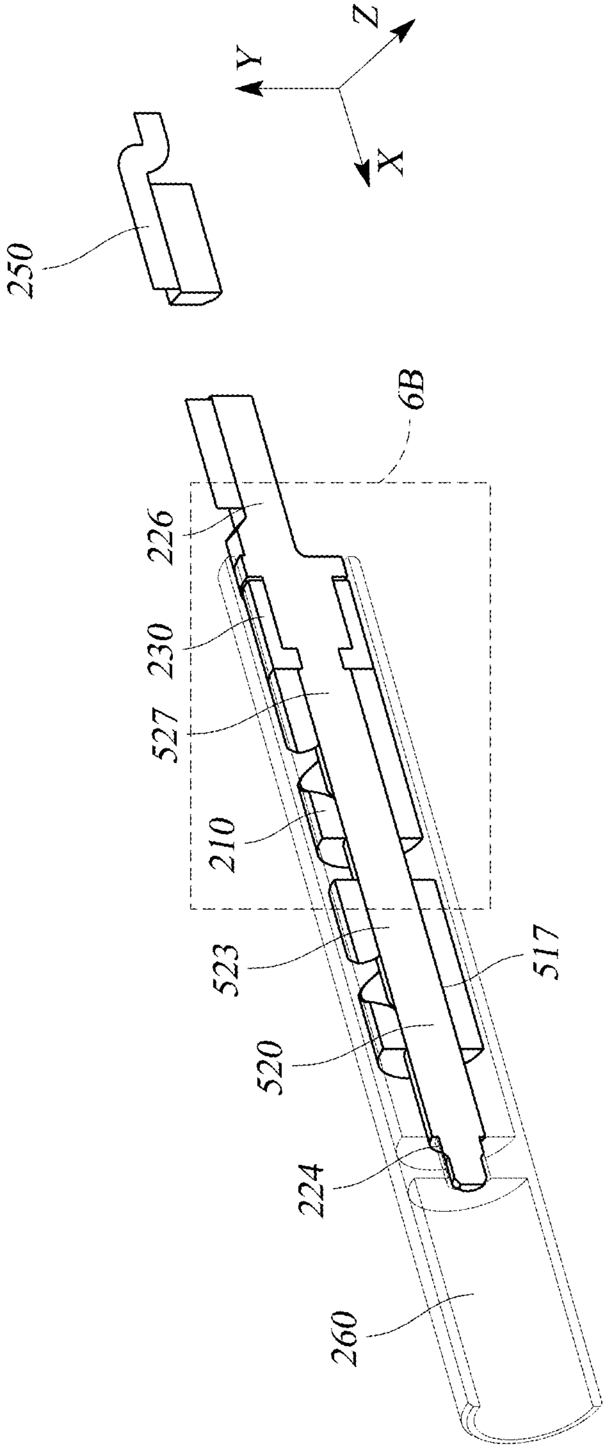
FIG. 6A illustrates a partial cross-sectional view of another embodiment of a hinge with the shaft of FIG. 5 for use in an electronic computing device.
Figure 6B:
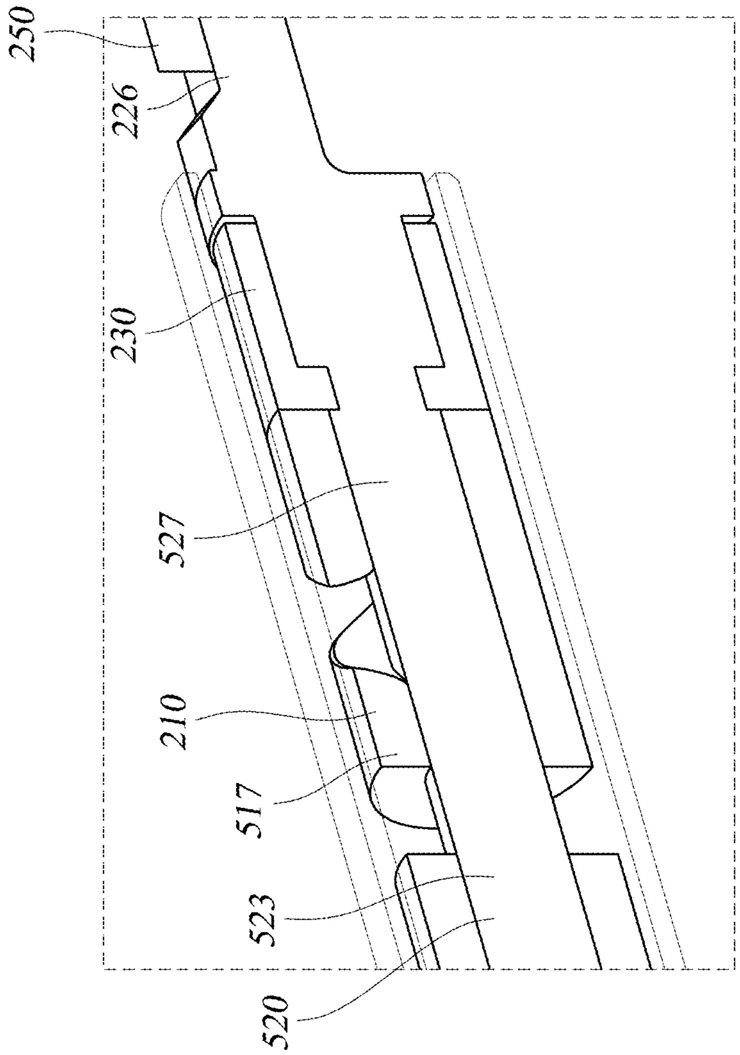
FIG. 6B illustrates a portion (indicated with dashed lines) of the hinge of FIG. 6A.

FIGS. 6A-6D illustrate another embodiment of the hinge assembly 200, which can have a variable rotational torque. As shown in FIGS. 6A and 6B the collar 210 can be initially positioned at a first position (e.g., a closed, folded position of the computing device 100) where the collar 210 is adjacent to or contacting the brace 230. A portion of the collar 210 is coupled to or extends at least partially around (e.g., wraps around) both the first section 523 and the second section 527 of the shaft 520. When the collar 210 is at the first position, an inner surface 517 of the collar 210 can be in contact with the first section 523 but not be in contact with the second section 527 (e.g., since the diameter of the first section 523 is larger than the second section 527 and diameter of the first section 523 corresponds to the diameter of the inner surface 517 of the collar 210). The contact area between the shaft 520 and the collar 210 does not extend along the entire length of the collar 210 in the first position, thereby reducing a torque required to initially open the computing device 100.

Figure 6C:
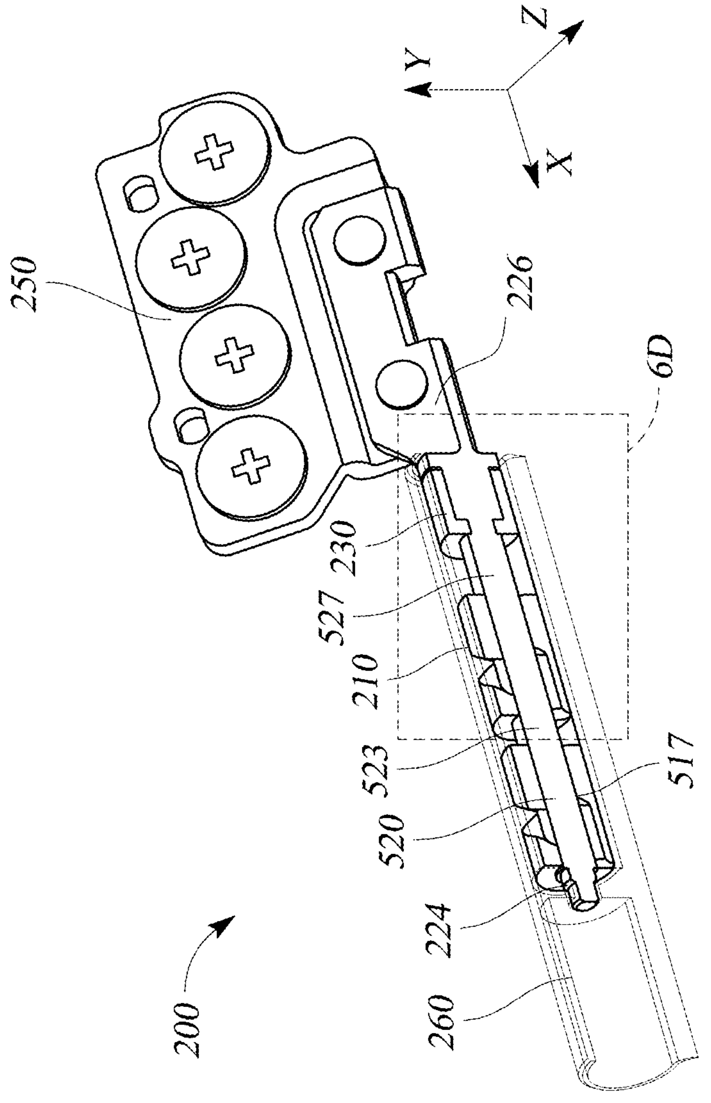
FIG. 6C illustrates another partial cross-sectional view of the hinge of FIG. 6A in a different position.
Figure 6D:
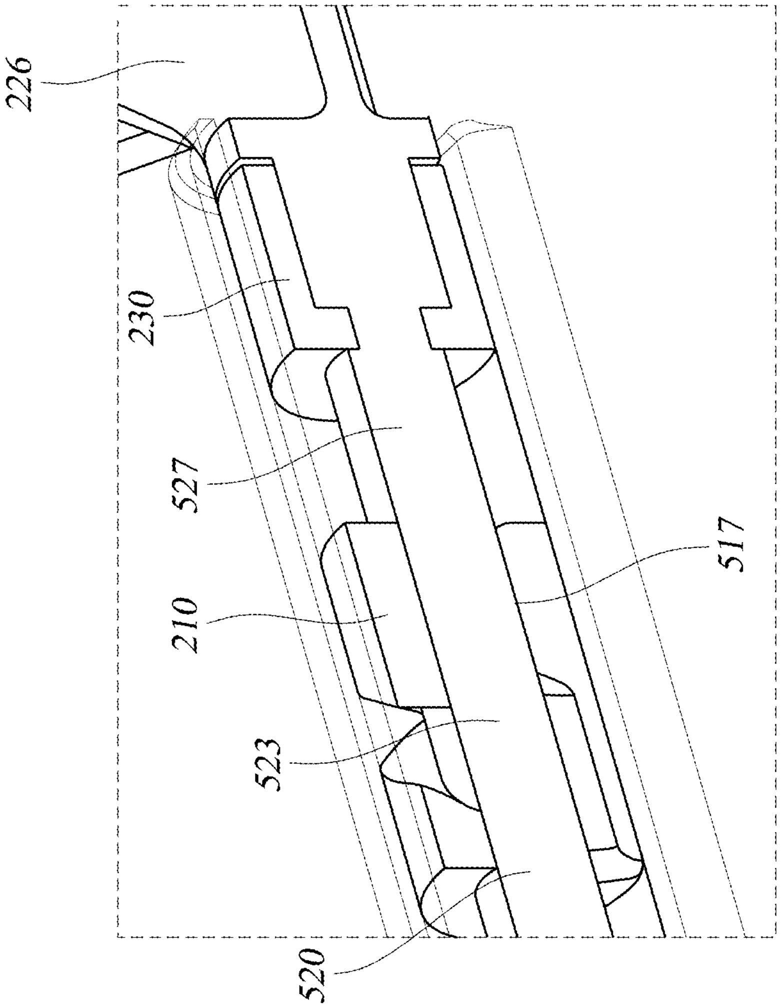
FIG. 6D illustrates a portion (indicated with dashed lines) of the hinge of FIG. 6C.

As illustrated in FIGS. 6C and 6D, the collar 210 can translate to a second position (e.g., an open, unfolded position of the computing device 100) where the collar 210 is positioned away from the brace 230 (e.g., since the collar 210 can translate along the positive X-direction). As the collar 210 translates from the first position to the second position, the contacting region between the inner surface 517 of the collar 210 and the shaft 520 can increase. As the inner surface 517 contacts more of the first section 523 of the shaft 520 during translation of the shaft 520 along the positive X-direction, the torque required to further open the computing device 100 increases. When the inner surface 517 is extending around the first section 523 and not the second section 527, the torque required to further open the computing device 100 can be greatest. As such, the torque can be variable (e.g., due to the increasing contact area during opening of the computing device 100). A variable torque implementation can provide a feeling of less torque during an initial stage of opening of the first housing 110 (e.g., about 0-90 degrees) and more torque during a subsequent stage of opening (e.g., about 91-135 degrees), or vice versa. When closing the computing device 100, the variable toque implementation can provide a feeling of greater torque during the initial closing stage of the first housing 110 (e.g., about 135-91 degrees) and a feeling of less torque during the subsequent closing stage (e.g., about 90-0 degrees), or vice versa. In some variants, the reduction in torque during the subsequent closing stage is because a portion of the inner surface 517 extends over the second section 527 to reduce the contact area between the collar 210 and the shaft 520.

While the above detailed description has shown, described, and pointed out certain novel features of the present disclosure as applied to various examples, it will be understood that various omissions, substitutions, and changes in the form and details of the device or process illustrated may be made by those skilled in the art without departing from the spirit of the present disclosure. For example, although certain examples are described above with channels in one structure (e.g., the collar) and projections on another structure (e.g., the shaft), certain variants swap the locations of the projections and the channels (e.g., the projections on the collar and the channels in the shaft). As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

Unless otherwise explicitly stated, articles such as "a" or "an" should generally be interpreted to include one or more described items. Accordingly, phrases such as "a device to" are intended to include one or more recited devices. Such one or more recited devices can also be collectively configured to carry out the stated recitations. For example, "a device to carry out recitations A, B and C" can include a first device to carry out recitation A working in conjunction with a second device to carry out recitations B and C.

All numbers expressing quantities, dimensions, and so forth used in the specification and claims are to be understood as being modified in all instances by the term "about." Accordingly, unless indicated to the contrary, the numerical parameters set forth in the specification are approximations that may vary depending upon the desired properties sought to be obtained by examples of the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various examples, of ±1%, ±5%, ±10%, or ±20%. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees and the term "generally perpendicular" can refer to something that departs from exactly perpendicular by less than or equal to 20 degrees.

The above description discloses several devices and methods of the present disclosure. The present disclosure is susceptible to modifications in the devices and methods, as well as alterations in the fabrication methods and equipment. Such modifications will become apparent to those skilled in the art from a consideration of this disclosure. Consequently, it is not intended that the present disclosure be limited to the specific examples disclosed herein, but that it covers all modifications and alternatives coming within the true scope and spirit of the present disclosure.

What is claimed is:

1. An electronic computing device comprising:

a first housing;

a second housing; and a hinge coupled to the first housing and the second housing, the hinge to enable the first housing to rotate relative to the second housing from a closed position to an open position, the hinge comprising:
a shaft having a first protrusion;
a bracket having a second protrusion;
a collar having a helical channel and a lift slot, the helical channel to receive the first protrusion of the shaft, the lift slot to receive the second protrusion of the bracket; and
a brace coupled to the bracket and the shaft;
wherein, during rotation of the first housing toward the open position:
the first protrusion slides in the helical channel;
the collar translates along the shaft in a first direction via the helical channel and translates along the bracket in a second direction via the lift slot; and
the brace blocks translation of the shaft relative to the first housing.

2. The electronic computing device of claim 1, wherein, during rotation of the first housing toward the open position, the first housing is vertically lifted away from the second housing.

3. The electronic computing device of claim 1, wherein, during rotation of the first housing toward the open position, the collar provides a frictional force along the shaft to keep the first housing in an open position.

4. The electronic computing device of claim 1, wherein, during rotation of the first housing from the closed position, the first protrusion is located at a first location of the helical channel, and during rotation of the first housing from the closed position to the open position, the first protrusion travels along the helical channel to move to a second location of the helical channel.

5. The electronic computing device of claim 4, wherein the helical channel extends about 135 degrees around the shaft from the first location to the second location.

6. The electronic computing device of claim 1, wherein the collar further comprises a guide pin engaged with the lift slot to couple the bracket to the collar.

7. The electronic computing device of claim 1, wherein the lift slot is curved.

8. The electronic computing device of claim 1, wherein, during rotation of the first housing toward the open position, a lifting speed of the first housing is non-linear.

9. The electronic computing device of claim 1, wherein the shaft has a first section and a second section, the first section of the shaft having a different diameter than the second section of the shaft.

10. The electronic computing device of claim 9, wherein, during rotation of the first housing toward the open position, a portion of the collar translates along the shaft from the second section to the first section to increase a contact area between the shaft and the collar, thereby providing a variable rotational torque.

11. An electronic computing device comprising:
a first housing;
a second housing; and
a hinge coupled to the first housing and the second housing, the hinge to enable the first housing to rotate relative to the second housing, the hinge comprising:
a shaft;
a collar coupled to the shaft, the collar having a channel and a lift slot, the channel to receive a portion of the shaft; and
a bracket coupled to the collar via the lift slot;
wherein, during rotation of the first housing:
the collar translates in a first direction along the shaft via the channel and translates along the bracket in a second direction via the lift slot; and
the collar maintains a substantially constant contact area with the shaft in the first direction, thereby providing a substantially fixed torque as the first housing rotates relative to the second housing.

12. The electronic computing device of claim 11, wherein, during rotation of the first housing, the first housing is vertically lifted away from the second housing.

13. The electronic computing device of claim 11, further comprising a brace coupled to the bracket and the shaft, the brace permits rotational movement of the shaft and prevent horizontal movement of the shaft.

14. The electronic computing device of claim 11, further comprising a cap positioned at a second end of the shaft.

15. The electronic computing device of claim 11, wherein, when the first housing is in a closed position, a protrusion of the shaft is located at a first location of the channel, wherein when the first housing is rotated relative to the second housing to a fully open position, the protrusion travels along the channel to move to a second location of the channel.

16. The electronic computing device of claim 11, wherein the lift slot is curved.

17. An electronic computing device comprising:
a first housing;
a second housing; and
a hinge coupled to the first housing and the second housing, the hinge to enable the first housing to rotate relative to the second housing, the hinge comprising:
a shaft;
a collar coupled to the shaft, the collar having a channel and a lift slot, the channel matingly engaged with the shaft; and
a bracket coupled to the collar via the lift slot;
wherein, during rotation of the first housing, the collar:
translates in a first direction along the shaft via the channel to a position beyond a terminal end of the shaft in the first direction, thereby reducing a contact area with the shaft to provide a variable rotational torque, and
translates along the bracket in a second direction via the lift slot.

18. The electronic computing device of claim 17, wherein, during rotation of the first housing, the first housing is vertically lifted away from the second housing.

19. The electronic computing device of claim 17, further comprising a brace coupled to the bracket and the shaft, the brace permits rotational movement of the shaft and prevent horizontal movement of the shaft.

20. The electronic computing device of claim 17, wherein, during rotation of the first housing toward a closed position, a lifting speed of the first housing is non-linear.

* * * * *